Dec. 7, 1954     W. E. BEYER     2,696,058
LICENSE PLATEHOLDER
Filed Nov. 2, 1950     2 Sheets-Sheet 1
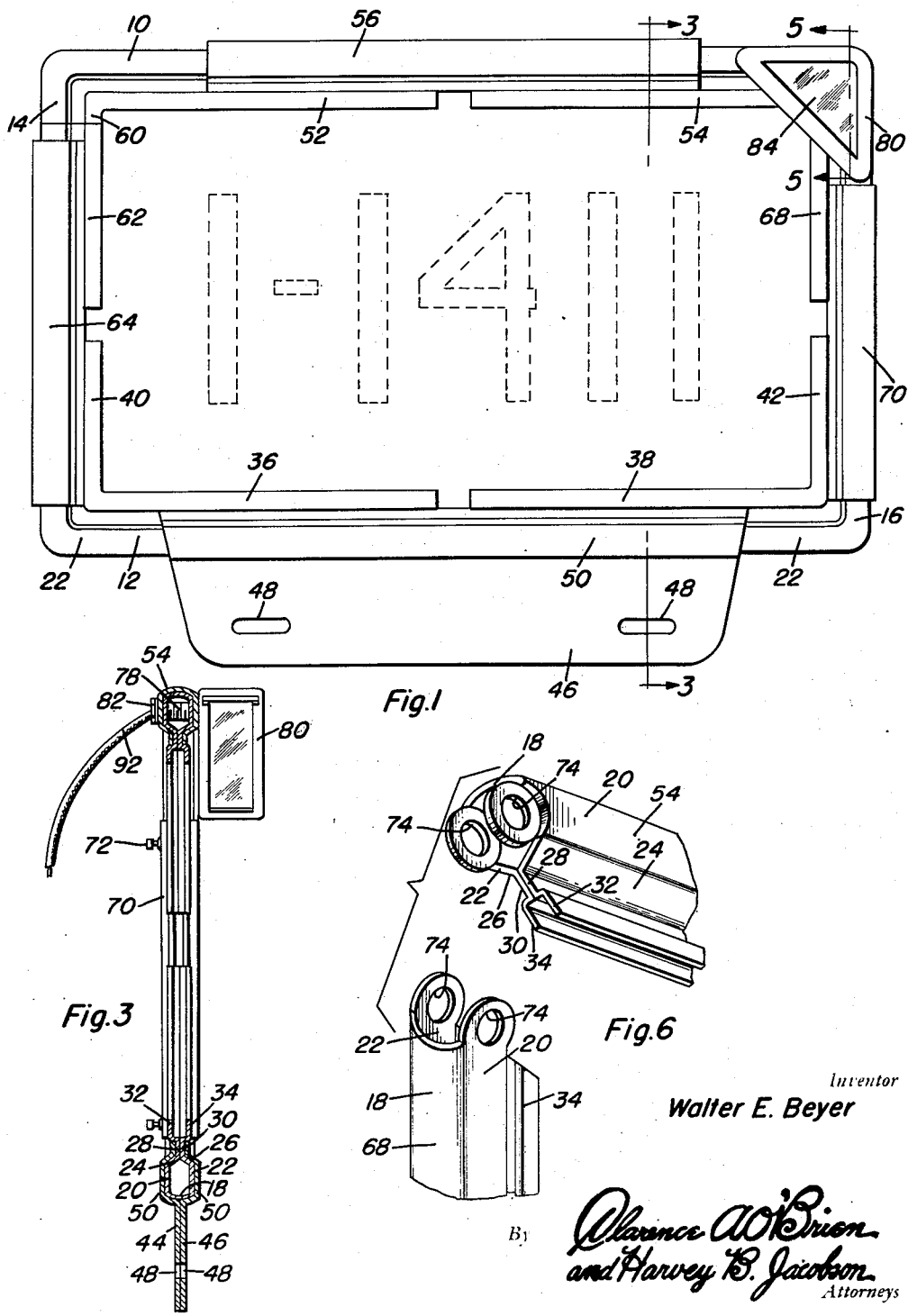
Inventor
Walter E. Beyer Dec. 7, 1954   W. E. BEYER   2,696,058
LICENSE PLATEHOLDER
Filed Nov. 2, 1950   2 Sheets-Sheet 2
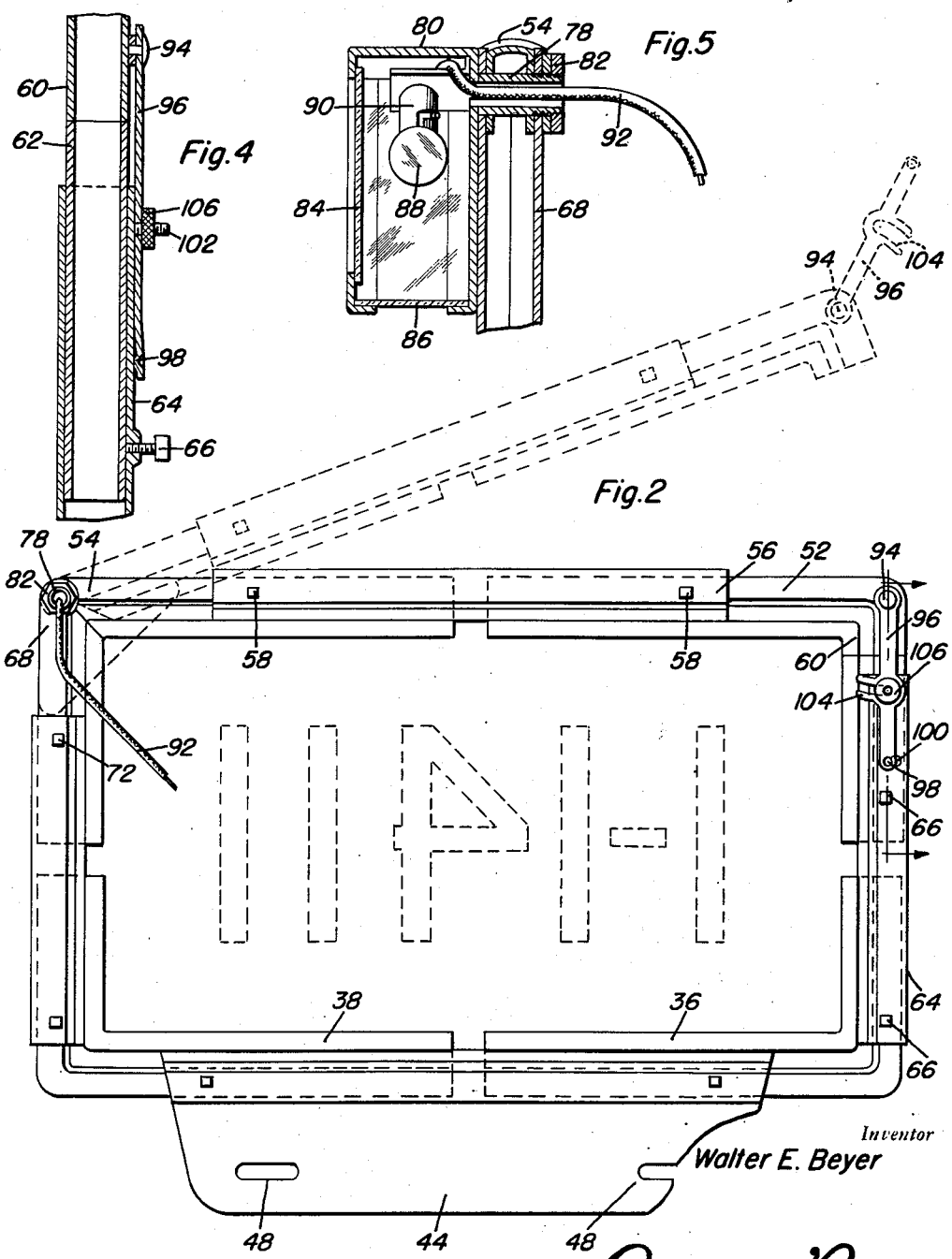
Inventor
Walter E. Beyer
By Clarence A. O'Brien
and Harvey B. Jacobson
Attorneys 2,696,058

LICENSE PLATEHOLDER

Walter E. Beyer, Donnelly, Idaho

Application November 2, 1950, Serial No. 193,689

5 Claims. (Cl. 40—132)

This invention comprises novel and useful improvements in a license plate holder and specifically pertains to an adjustable frame for holding license plates for motor vehicles.

The primary object of this invention is to provide an adjustable frame for holding license plates for motor vehicles in which the adjustment of the frame to accommodate different sizes of license plates may be effected with ease and certainty, and wherein the frame may be retained securely in adjusted position.

A further object of the invention is to provide an improved adjustable frame in accordance with the preceding object, in which there is incorporated a novel pivoted top wall or closure for the frame to permit the ready insertion or removal of license plates into and from the frame; and whereby the hinged top wall of the frame may be readily and securely locked in its closed position.

A still further object of the invention is to provide an improved adjustable license frame in accordance with the foregoing objects, in which a novel hinged connection is provided between the hinged upper or top wall of the frame and a side wall thereof; wherein improved means is provided for illuminating a license plate held within the frame; and wherein the pivot pin for the hinged top wall of the frame is utilized as a conduit for the electric cables supplying current to the illuminating means.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a front elevational view of an adjustable frame in accordance with the present invention;

Figure 2 is a rear elevational view of the frame of Figure 1, the top wall of the frame being shown in its open position in dotted lines therein;

Figure 3 is a vertical transverse sectional view taken substantially upon the plane indicated by the section line 3—3 of Figure 1;

Figure 4 is a vertical transverse sectional view taken substantially upon the plane indicated by the section line 4—4 of Figure 2 and showing the arrangement of the latching means of the top or closure wall of the frame;

Figure 5 is a vertical transverse sectional view taken substantially upon the plane indicated by the section line 5—5 of Figure 1 and showing the arrangement of the illuminating and the pivot means of the frame; and Figure 6 is a perspective assembly detail view showing the manner in which the top and end wall of the frame are adapted and constructed for pivotal engagement with each other.

Referring now more specifically to the accompanying drawings, wherein like numerals designate similar parts throughout the various views, it will be seen that there is disclosed an adjustable, substantially rectangular license plate holding frame which consists of a plurality of walls each in the form of channel members, and which may advantageously be constructed of any lightweight sheet metal material, preferably of a rust-proof nature.

The substantially rectangular license plate holding frame includes a top wall 10, a bottom wall 12, and a pair of end walls 14 and 16. Each of these walls is constructed of sheet metal and of a channel member formation, as set forth hereinafter. Further, each of the walls is of a longitudinally adjustable construction to permit the size of the license plate holding frame to be adjusted as desired, in order to adapt the same to accommodate different sizes of license plates.

Considering first the bottom wall 12, it will be seen that the same consists of a sheet metal channel member having a bottom web portion 18 folded to provide a pair of parallel side walls 20 and 22, which have converging wall portions 24 and 26, respectively, and which are then again bent to provide parallel walls 28 and 30 disposed in side-by-side relation, these latter walls terminating in parallel spaced walls 32 and 34 which thus provide a channel therebetween to receive and embrace the bottom edge of a license plate.

As will be readily apparent from Figures 1, 2 and 3, the bottom wall 12 consists of two members of the shape and character just described, which are disposed in end-to-end alignment but spaced from each other, each of these members having thus an aligned portion indicated by the numerals 36 and 38. At their outer ends, the members 36 and 38 are provided with integral perpendicularly upwardly extending portions 40 and 42, similarly constructed, and the members 36, 40 and 38, 42 constitute L-shaped members. It will now be apparent that the spacing of the members 36 and 38 with respect to each other may be varied to secure the desired longitudinal adjustment of the bottom wall 12.

The bottom wall portions 36 and 38 are secured in their longitudinally adjusted position with respect to each other by means of a pair of parallel clamping and mounting plates 44 and 46, the lower portions of which are provided with apertures 48 whereby these plates may be secured to the customary mounting for license plates upon motor vehicles, the upper portions of these plates being provided with recessed portions 50 shaped to embrace the side walls 20 and 22 of the bottom wall 12. It will be apparent that when the two parallel supporting plates 44 and 46 are clamped to their support, they will, in turn, firmly grip and clamp between the upper ends of the same the longitudinally spaced portions 36 and 38 of the bottom wall 12, thereby rigidly securing these portions in the desired longitudinally adjusted position.

The top wall 10 is likewise composed of a pair of aligned, longitudinally spaced and adjusted members 52 and 54 which are secured together by a channel-shaped clamping member 56 of a channel-shaped cross-section adapted to embrace and telescopically receive portions 52 and 54, set screws or the like 58 being provided in the member 56 for locking the portions 52 and 54 in longitudinally adjusted position. The portions 52 and 54 are of the same cross-sectional shape and construction described with respect to the bottom wall portions 36 and 38.

At its outer end, the top wall section 52 has an L-shaped, downturned portion 60 of cross-sectional shape and construction similar to the portions 40 and 10, this L-shaped depending leg 60 being intended to abut and rest upon the upper end of a section 62 disposed in alignment with and in longitudinal adjustment with respect to the upstanding section 40 of the end wall 14. The straight end wall section 62 is adjustably clamped to the wall section 40 by means of a clamping sleeve 64 which telescopes over and slidably embraces the sections 62 and 40, this sleeve being of the same construction as the sleeve 56, and provided with adjusting set screws 66 as shown in Figure 2.

The other end wall 60 is provided with a top, longitudinally spaced and adjusted channel-shaped section 68, similar to the section 62, and similarly clamped to the lower section in longitudinally adjusted position, as by a clamping sleeve 70 telescopingly received over the same, and secured thereto as by set screws 72, this sleeve being of the same construction as the sleeve 64.

However, the adjacent ends of the sections 54 and 68 are of somewhat modified construction to provide a means of connection therebetween, this cooperating hinged construction being shown more clearly in Figure 6. As shown in that figure, the side wall section 68, provided with its web portion 18, and with parallel side walls 20 and 22, together with the spaced flanges, one of which is shown at 34, has the upper end portions of the side walls 20 and 22 provided with apertures or eyes 74 for receiving a pivot pin. Similarly, the top wall section 54 has the above mentioned web portion 18, the side walls 20 and 22, the converging wall portions 24 and 26, the flat contacting wall portions 28 and 30, together with the spaced end walls 32 and 34 forming a channel member to receive the upper end of the license plate. The adjacent end surfaces of the wall portions between the side walls 20 and 22, and the spaced walls 32 and 34 are mitered or cut upon an angle, as suggested in Figures 2 and 6, in order to permit the top wall to close snugly upon the end walls to complete the closure of the frame. The end walls 20 and 22 of the top member 54 are likewise provided with apertured portions 74 forming eyelets which register with the eyelet 74 of the wall section 68. A pivot pin is disposed through these eyelets, as set forth hereinafter, to hingedly connect the top wall to the end wall 16 and thereby permit the top wall to be pivotally opened and closed with respect to the end walls of the frame.

As shown more clearly in Figures 1, 3 and 5, the top wall section 54 and the end wall section 68 are hingedly connected by a tubular sleeve 78 constituting a pivot pin, and this sleeve is preferably welded or otherwise rigidly attached to the back wall of a substantially triangular shaped housing 80 which is thus positioned across the hinged end of the frame. In order to secure the housing 80 to the hinged ends of the frame members 54 and 68, the sleeve 78 is externally threaded for the reception of a fastening nut 82. The housing is provided with one or more transparent or light-transmitting panes 84 and 86 so that light from an electric bulb 88 of conventional design and carried by a conventional form of light socket 90 disposed within the housing may illuminate the license plate carried thereby. Electricity is fed from any suitable electric source, not shown, to the light bulb through an electric cable or conductor 92 which extends through the tubular pivot member 78 into the housing 80.

Thus, the pivot pin is employed not only to hingedly mount the top member of the frame to the end member of the same, but also to support the housing thereon and to supply current to the light bulb within the housing.

As shown more clearly in Figures 2 and 4, the other end section 52 of the top wall 10 has pivotally attached thereto as by a rivet or similar pivotal connection 94, one end of a latching lever 96 whose other end may be provided with a detent portion 98 engageable in a depression 100 carried by the surface of the clamping member 64. The latter further provides an upstanding, externally threaded stud 102, adapted to receive an arcuately shaped notch 104 at the intermediate portion of the lever 96, and a thumb nut 106 is employed to lock the latching lever in its closed position. Thus, the hinged top wall of the frame may be securely latched in its closed position to securely retain the license plate within the frame.

From the foregoing, it is thought that the novel construction of the frame together with its many advantages of operation will be readily apparent, and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. An adjustable frame for holding license plates comprising top and bottom walls connected by a pair of end walls, each wall consisting of a channel member opening interiorly of the frame, the top wall being pivotally hinged to one end wall and having a latch engageable with the other end wall for securing the top wall to the end walls, said latch including a lever pivoted to said top wall, a stud and thumb nut on said other end wall, said latch having a notch for receiving said stud.

2. An adjustable frame for holding license plates comprising top and bottom walls connected by a pair of end walls, each wall consisting of a channel member opening interiorly of the frame, the top wall being pivotally hinged to one end wall and having a latch engageable with the other end wall for securing the top wall to the end walls, a triangular shaped housing secured to said one end wall of said frame and having a light transmitting panel therein for illuminating a license plate mounted in said frame, a light in said housing.

3. The combination of claim 3 including a tubular pivot hinging said top wall to said one end wall and communicating with the interior of said housing, wires for said light extending through said tubular pivot.

4. An adjustable frame for holding license plates comprising top and bottom walls connected by a pair of end walls, said walls being in the form of inwardly directed channels each having a web and flanges, said top wall and one of said end walls having hinge eyes on the ends of their flanges, a tubular fastener passed through said eyes to pivotally connect said top wall to said one end wall, said tubular fastener being carried by a light frame and being the mounting means therefore.

5. The combination of claim 4, wherein said light frame conceals the juncture between said top wall and said one end wall, a fastener releasably connecting an opposite end of said top wall to the other of said end walls, said fastener being concealed from direct view.

References Cited in the file of this patent

UNITED STATES PATENTS

| Number | Name | Date |
| --- | --- | --- |
| 872,769 | Stevenson | Dec. 3, 1907 |
| 1,464,283 | Krajeski | Aug. 7, 1923 |
| 1,510,952 | Murphy | Oct. 7, 1924 |
| 1,601,123 | King | Sept. 28, 1926 |
| 1,647,380 | Terwilliger | Nov. 1, 1927 |
| 1,936,287 | Campbell | Nov. 21, 1933 |
| 1,983,614 | Kenny | Dec. 11, 1934 |

FOREIGN PATENTS

| Number | Country | Date |
| --- | --- | --- |
| 19,262/91 | Great Britain | Aug. 6, 1892 |